Figure 1:
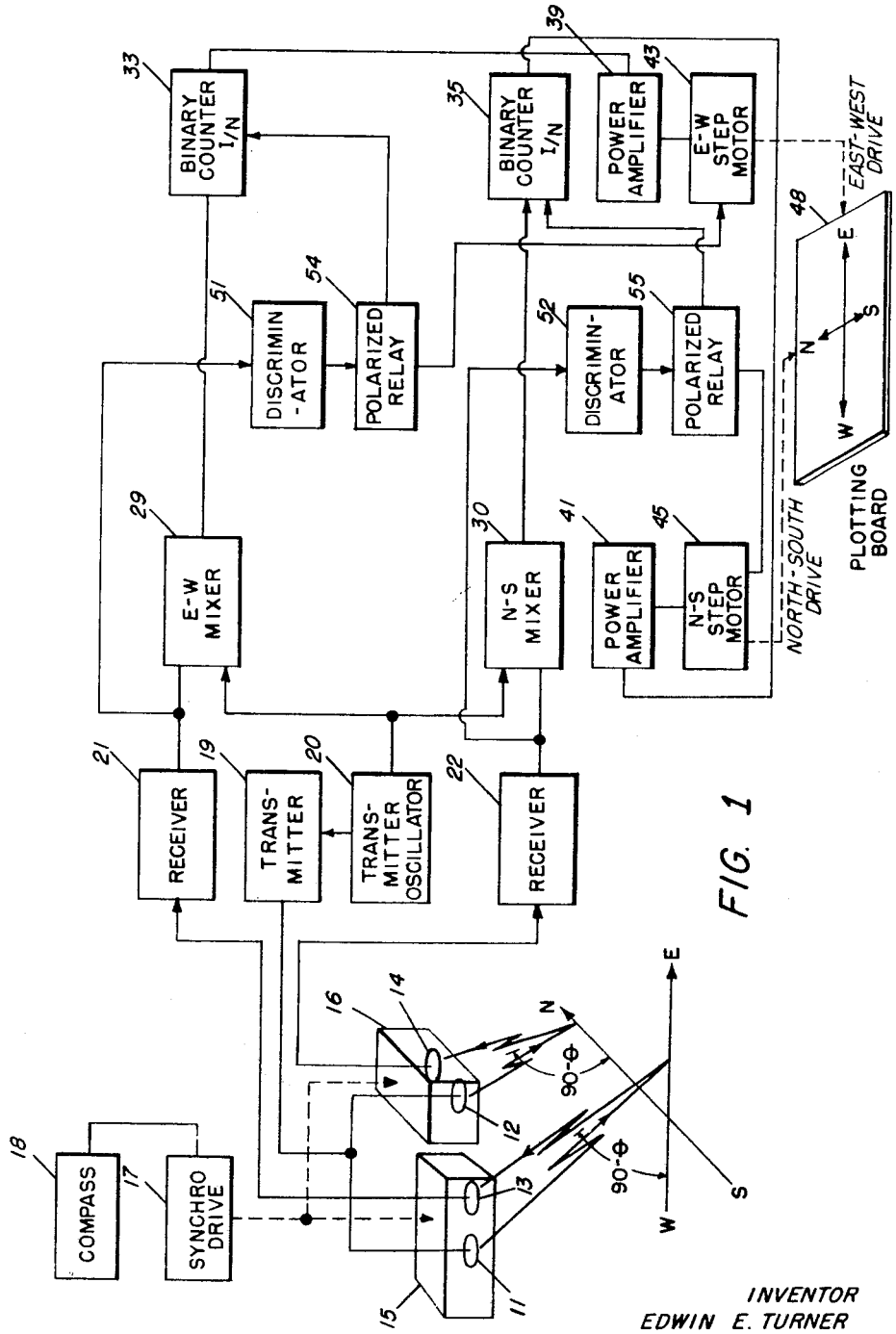

Nov. 20, 1962  E. E. TURNER  3,065,463
DOPPLER NAVIGATION SYSTEMS
Filed Dec. 31, 1959  2 Sheets-Sheet 1

INVENTOR
EDWIN E. TURNER
BY *H. Vincent Harsha*
ATTORNEY

United States Patent Office 3,065,463
Patented Nov. 20, 1962

3,065,463
DOPPLER NAVIGATION SYSTEMS
Edwin E. Turner, Wayland, Mass., assignor to Raytheon Company, Lexington, Mass., a corporation of Delaware
Filed Dec. 31, 1959, Ser. No. 863,273
12 Claims. (Cl. 343—9)

This invention relates to Doppler navigation systems and, more particularly, to a Doppler system for indicating the sign and magnitude of a velocity vector with means coupled thereto for determining distance travelled in the direction of said vector.

Several Doppler navigation systems are currently in use on military and civilian aircraft. These systems include radar transmitting and receiving equipment and detect the Doppler shift of transmitted radar signals which reflect from the terrain below the craft. Other Doppler navigation systems employed for nautical navigation use sonar transmitting and receiving equipment and detect the Doppler shift of sound waves which reflect from the ocean bottom. The principles of operation in both these systems are often the same and the differenes in structure employed are not necessitated by different operating principles, but rather by differences in frequency, propagation velocity, craft velocity, and techniques for detecting and transmitting. Therefore, the new Doppler navigation system described in this invention is applicable in principle where radar or sonar transmitting and receiving systems are employed and, thus, is useful for aircraft navigation and nautical or underwater navigation.

In some prior Doppler navigation systems a Doppler frequency signal obtained by mixing the transmitted frequency with the received frequency is fed to analog circuits and therein transformed into motions or shaft displacement representative of the Doppler frequency shift or craft velocity. In other applications the Doppler shift frequency signal is applied to a synchronous motor, the speed of which is representative of velocity and serves to drive a display, such as a plotting board. One disadvantage of such prior systems is that accuracy is lost due to lost motion in mechanical linkages or the requirement that the movement of shafts be proportional to actuating frequencies. In other applications it is desirable to detect craft velocity in each of perpendicular directons, such as north and east, for energizing a two dimensional display, such as a plotting board, which includes a pointer driven in two directions by motors which are energized by signals proportional to the craft velocity in the chosen directions. Such systems are quite simple and efficient and the motors serve a two-fold purpose. First they serve to integrate signals representing velocity yielding mechanical outputs representing craft position and secondly they provide the mechanical drive for animating the display. In these systems, Doppler shift frequency, representing velocity, is obtained from a mixing device which mixes transmitted with received frequency signals and a resulting frequency signal which varies with the Doppler shift frequency is applied to a synchronous motor. The speed of this motor is representative of velocity and, as noted, serves to drive the display. However, in many such applications it is advantageous not to attempt to measure velocity except as a secondary output and rather to measure the distance moved directly by using, for example, a carrier frequency as the time base. It is, therefore, desirable to provide a Doppler navigation system which avoids the step of first measuring velocity and then translating by analog means signals representing measured velocity into mechanical movement. It is further desirable to provide an accurate system in which the information signals are retained in their original form for as long as possible prior to their direct use to drive a display which indicates craft position relative to an initial or reference position.

In accordance with the Doppler navigation system of the invention, wave energy is transmitted and received in two different directions which are always perpendicular to each other and referenced to earth coordinates so as to obtain two Doppler shifts representing a craft's velocity in their respective perpendicular directions. To obtain the Doppler shifted energy, the return signals for each perpendicular direction are beat with the carrier frequency in a mixer. The beat note signals are amplified and fed to a digital counter having a predetermined count down. The output of the digital counter for each perpendicular direction is then applied directly to a plotting board step-motor which integrates velocity into distance and drives a recording pointer in the horizontal and vertical direction across the plotting board. To reverse the direction of plot when the pointer is moving, for example, south or west across the plotting board, the aforementioned return signals are fed to discriminators which compare the output of the receiver to the transmitted carrier. This comparison establishes whether the frequency of the Doppler shifted energy is higher or lower than the carrier frequency. The output of each discriminator is applied to a polarity sensitive device or relay which, depending upon the output polarity of the discriminator, reverses the plotting motors on the plotting board and causes the counters to subtract or add as required within the counting interval. In this manner, accurate information representing Doppler frequency shift is retained in digital form until its conversion directly into plotting motion along the two coordinates of the plotting board.

The invention further discloses a Doppler navigation system in which craft velocity over the earth's surface in a given direction can be detected and indicated, the indication being in the form of a direct reading counter which is connected to the output of a digital counter adapted to count Doppler frequency shift. The direct reading counter in this instance denotes sign as well as magnitude of the distance travelled.

Figure 2:
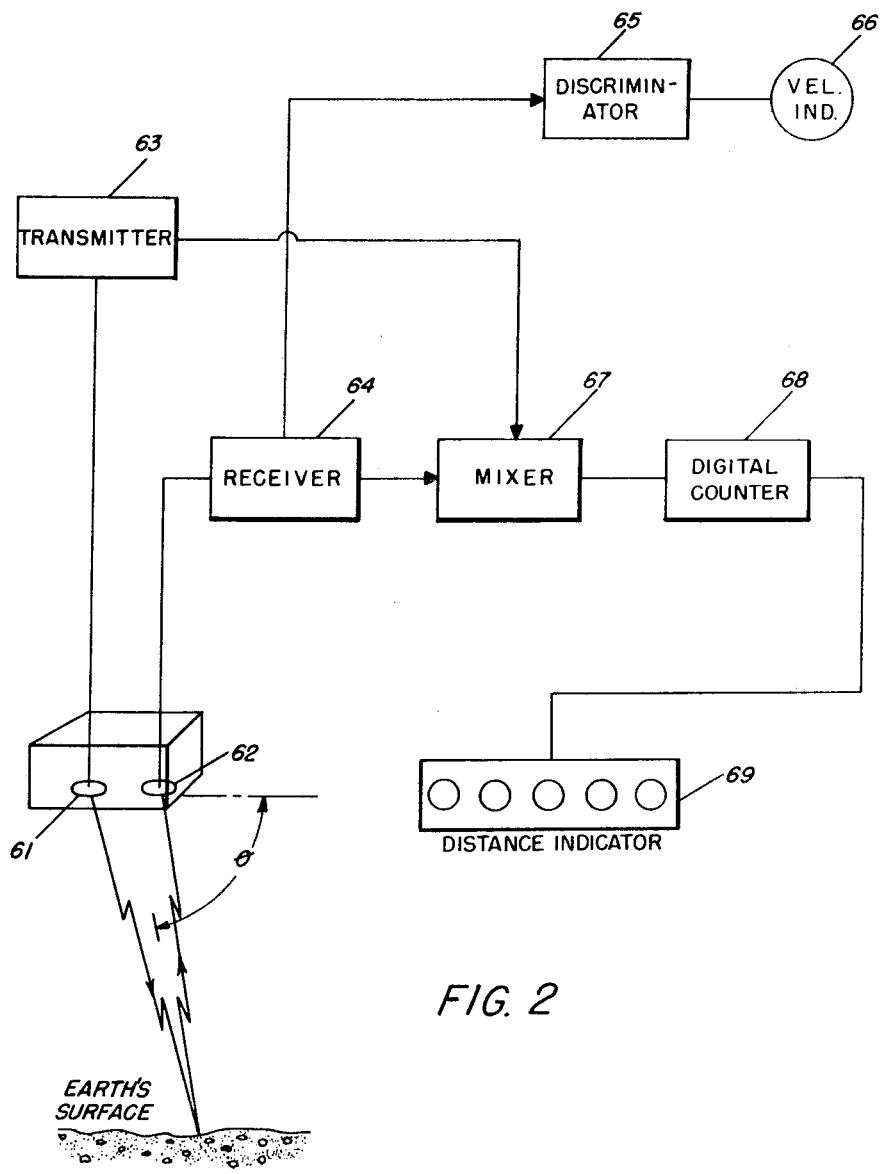

Other features and objects of the invention will be more apparent from the following specific description taken in conjunction with the drawings in which:

FIG. 1 is a schematic diagram of a system for detecting and indicating craft position relative to a given point of departure on the earth in any direction resolved from perpendicular components of distance travelled; and FIG. 2 is a schematic diagram for a simpler system for detecting and indicating craft velocity and distance in one direction relative to the earth.

If the transmitted frequency for transmitting radar energy or sonar energy, as the case may be, is denoted $F_t$ and the frequency of energy reffected from the terrain below the craft is denoted $F_d$, then $F_d$ is related to $F_t$ as follows:

$$F_d = F_t \frac{(c + v \cos \theta)}{(c - v \cos \theta)}$$

In the equation, $c$ represents the velocity of wave propagation of the energy, $v$ is the craft velocity in the direction of the transmitted and reffected energy, while $\theta$ is the angle between the direction of transmitted energy and the horizontal, commonly called the deflection angle. As a rule, $v$ is much less than $c$. Where radar is employed, $c$ is the speed of light or 186,000 m.p.s. and where sonar is employed $c$ is the speed of propagation of sound in water or about 2,840 knots. Consequently, for either application the equation may be written with negligible error as follows:

$$F_d = F_t \left( i + 2\frac{v}{c} \cos \theta \right) \text{ when } v \ll c$$

Referring now to FIG. 1, there is shown one embodiment of the invention whereby craft movement over the earth's surface in two different directions which are perpendicular to each other can be detected and indicated. The invention includes means for transmitting and receiving wave energy in two different directions which are perpendicular to each other so as to obtain two Doppler shifts representing a craft velocity in perpendicular directions relative to the terrain below. The system consists of transmitting transducers 11 and 12 transmitting wave energy in directions perpendicular to each other as denoted, for example, north and east. Similar receiving transducers 13 and 14 are provided for receiving wave energy transmitted from transducers 11 and 12, respectively, and reflected from the terrain or a reflecting surface. The pair of transducers 11 and 13 and the pair 12 and 14 are shown contained separately in structures 15 and 16. The structures are driven in rotation by synchro drive 17 which is coupled and slaved to compass 18. The vertical axis of the synchro drive is stabilized in a well-known manner from a craft's stable element (not shown) to keep the angle $\theta$, shown in FIG. 1, constant with respect to the earth regardless of the craft's pitching and rolling. As a result of coupling the synchro drive to compass 18, energy directed from transmitting transducer 11 is always in an easterly direction and the energy transmitted from transmitting transducer 12 is always directed in a northerly direction and, consequently, the velocity of the craft equipped with such a system can be readily obtained in two dimensions, as will be described in detail. Transmitting transducers 11 and 12 are, for example, energized from the same source, such as a transmitter 19, whose frequency is controlled by transmitter oscillator 20 while the signals for receiving transducers 13 and 14 are applied to separate receivers 21 and 22. The outputs of receivers 21 and 22 are fed to mixers 29 and 30 which mix those output signals with the signal from the transmitter oscillator 20. In this manner the return signals for each perpendicular direction are beat with the carrier frequency in the appropriate mixer. The beat note signals are applied to similar digital counters 33 and 35. Digital counters 33 and 35 are preferably binary counters having the same number of stages and producing pulse outputs at rates $1/N$ times the signal rates from their associated members, where N is an integral number. Each binary counter is a positive and negative counter, sometimes referred to as a subtracting counter, that is, each counter is capable of reversal so as to subtract instead of add within the counting interval. This ability to subtract within the counting interval reduces the plotting error due to small changes in heading of the craft about exact north, east, south or west directions which produce near zero Doppler above and below the carrier frequency radiated at right angles to these courses. The outputs from binary counters 33 and 35 are applied to power amplifiers 39 and 41, respectively, which serve to amplify the energy therefrom and produce square waves or pulses of the same frequency as the pulse rate from the binary counters. Amplifiers 39 and 41 in turn energize step motors 43 and 45. The step motors are ratchet motors which provide an absolute shaft rotation proportional to the count provided by the binary counters. In this manner, a high degree of accuracy is achieved inasmuch as the output of each motor is used as the drive mechanism for a two dimensional plotting board 48 on which is plotted the position of the craft relative to its initial position or relative to a reference point. The shaft step-speed of motor 43 is representative of the received frequency from the easterly direction while the speed of motor 45 is representative of the received frequency from the northerly direction. In this manner, information representing Doppler frequency shift is retained in digital form until its conversion into plotting distance.

Referring again to FIG. 1, the output of receivers 21 and 22, respectively, are applied to discriminators 51 and 52. The center frequency of these discriminators is tuned to the carrier frequency and the output of each receiver is compared with this center frequency. This establishes whether the frequency of the Doppler shifted energy from each receiver is higher or lower than the carrier frequency. The output of each discriminator is fed to polarized relays 54 and 55 which, depending on the sense of the discriminator output, reverses the north-south step motor or the east-west step motor in response to a change of heading of the craft to the opposite side of the desired course. For example, as shown in FIG. 1, when the craft turns to the west of north, the Doppler on the east stabilized beam becomes polarized in the negative sense, that is to say, the Doppler shift frequency received is lower than the transmitted carrier. This actuates the polarized relay 54 to provide a correction signal to the east-west step motor 43 to cause the recording pointer to move to the west. However, if the craft's heading changes to the east of north, the polarized relay reverses the plotting motor to move the plotting arm (not shown) in the opposite direction across the plotting board 48. This same principle applies to the north-south drive applied to the plotting board in response to the north-south step motor 45. In addition, when the polarized relays 54 and 55 reverse their associated motor on the plotting board, they also reverse the associated binary counter to subtract instead of add within the counting interval. Thus, when the counter and step motors are fed reversing signals, the counter counts towards zero and then counts upward from zero by a well-known subtracting process. In this manner, the statistical probability of error in plotting motion at right angles to the course being made good due to oscillation about a present quadrantal course is substantially reduced.

Referring to FIG. 2, there is shown an embodiment of this invention whereby craft velocity over the earth's surface in a given direction can be detected and indicated, the indication denoting sign as well as magnitude of the velocity. Additional means are provided for directly indicating distance. In FIG. 2 there are shown transducer devices 61 and 62 for propagating wave energy and receiving reflected energy, respectively. Transducer 61 is coupled to and energized by transmitter 63 while transducer 62 feeds signals to receiver 64. The output of the receiver 64 is fed to a discriminator 65 which uses its center frequency as a reference to produce a direct current output proportional to velocity. This output is applied to indicator 66 which can be, for example, a D.-C. voltmeter. The magnitude of the discriminator voltage is proportional to the velocity of the craft. In like manner, the transmitter output is applied to mixer 67 to be compared with the output of a receiver 64 to provide Doppler beat notes which are spaced proportional to the distance travelled over the earth's surface for a given angle $\theta$ and for a given radiated frequency $F_t$. These beat notes are counted down in a binary digital counter 68. This counter counts the beat frequency for a given length of time as fixed by the carrier. By reducing the count down, the distance resolution can be adjusted to any desired value, such as to approximately sixty feet or one hundred counts for every nautical mile. In this manner, distance can be obtained directly without first obtaining velocity and the distance information is retained in digital form until it is directly indicated by a distance indicator 69. This indicator is, for example, a Veeder counter which indicates distance directly in miles and hundredths of a mile. Thus, distance is read directly in miles travelled and velocity is indicated directly in miles per hour by velocity indicator 66.

While there is described above the principles of this operation as represented by different embodiments for one dimensional and two dimensional representations of craft velocity, it is to be understood that these are made only by way of example and that other devices could be

What is claimed is:

1. A Doppler navigation system including wave energy transmitting and receiving means, frequency mixing means coupled to said transmitting and receiving means, digital counting means coupled to said frequency mixing means to produce pulses, and means for converting each of said pulses into equal increments of motion.

2. A Doppler navigation system including wave energy transmitting and receiving means on a craft, first and second frequency mixing means coupled to said transmitting and receiving means, respectively, digital counting means coupled to said frequency mixing means, driving step motor means connected to said digital counting means, the absolute shaft rotation of said step motor means being proportional to the output count of said digital counting means, thereby representing the sign and magnitude of craft movement with respect to a fixed reference.

3. A Doppler navigation system including wave energy transmitting and receiving means, frequency mixing means coupled to said transmitting and receiving means, digital counting means coupled to said frequency mixing means to produce pulses, means for converting each of said pulses into equal increments of motion, and sensing means connected to said frequency mixing means to reverse the direction of said increments of motion.

4. A Doppler navigation system for detecting the sign and magnitude of craft velocity relative to the earth comprising means on said craft for directing wave energy toward the earth and detecting the reflection of said wave energy therefrom, a source of wave energy coupled to said energy directing means, a plurality of mixing means at least one coupled to said source and the remaining coupled to said detecting means, digital counting means connected to said mixing means for providing a direct count of the Doppler shift frequency in the reflected wave energy, and step motor means coupled to said digital counting means for producing an output motion representative of the sign and magnitude of craft velocity.

5. A Doppler navigation system for detecting the sign and magnitude of craft velocity relative to the earth comprising means on said craft for directing wave energy toward the earth and detecting the reflection of said wave energy therefrom, a source of wave energy coupled to said energy directing means, a plurality of mixing means coupled to said source and to said detecting means, digital counting means connected to said mixing means for providing a direct count of the Doppler frequency shift, discriminator means coupled to said mixing means, a plurality of step motors, and relay sensing means connected in circuit with said discriminator means and said step motors to reverse the direction of rotation of said step motors.

6. A Doppler navigation system for detecting craft velocity relative to a reflecting surface comprising frequency transmitting and receiving means on said craft for directing signal energy towards the earth and detecting the reflection therefrom, a frequency source coupled to said transmitting means, first and second mixers coupled to said source and said receiving means, respectively, first and second digital counting means each responsive to the output from a different one of said mixers, first and second step motors each energized by the output of a different one of said frequency counting means, said motors producing an output shaft rotation, the magnitude and direction of said shaft rotation being proportional to the count of said digital counting means and representing the magnitude and sign of craft velocity, first and second frequency discriminating means coupled to said first and second mixers, respectively, and polarized switching means coupled to said discriminating means and said step motors to reverse the direction of said output shaft rotation.

7. A Doppler navigation system comprising energy transmitting and receiving means on a craft, said receiving means adapted to provide in the form of beat notes the Doppler frequency shift signals transmitted and received, respectively, by said energy transmitting and receiving means, digital means for counting said beat notes, and a plurality of motors driven by said counting means to produce a step motion representative of the sign and magnitude of craft velocity.

8. A Doppler navigation system comprising energy transmitting and receiving means on a craft, said receiving means on a craft, said receiving means adapted to provide in the form of beat notes the Doppler frequency shift between signals received and transmitted by said energy transmitting and receiving means, means for counting said beat notes according to a prescribed digital count, a plurality of motors driven by said counting means to produce an output motion representative of the sign and magnitude of craft velocity, and discriminator means fed by said receiving means to apply to said motors a signal of a polarity adapted to control the direction of said output motion.

9. A Doppler navigation system comprising energy transmitting and receiving means on a craft, said receiving means adapted to provide in the form of beat notes the Doppler frequency shift between signals received and transmitted by said energy transmitting and receiving means, means for counting said beat notes according to a prescribed digital count, a plurality of motors driven by said counting means to produce an output motion representative of the sign and magnitude of craft velocity, discriminator means fed by said receiving means to apply to said motors a signal of a polarity adapted to control the direction of said output motion, and means connected to said discriminator means to cause said counting means to subtract instead of add the count of said beat notes during a predetermined counting interval.

10. A Doppler navigation system including wave energy transmitting and receiving means, frequency mixing means coupled to said transmititng and receiving means to produce beat notes, means coupled to said frequency mixing means to produce pulses indicating a digital count of said beat notes, and means for converting said pulses into increments of motion.

11. In combination, means for transmitting and receiving signals along a direction corresponding to a north-south axis and along an axis at right angles thereto, means for providing in the form of beat notes the Doppler frequency shift of signals received from said directions, means for counting said beat notes to provide pulses, and means for converting said pulses into increments of motion.

12. In combination, means for transmitting and receiving signals along a direction corresponding to a north-south axis and along an axis at right angles thereto, means for providing in the form of beat notes the Doppler frequency shift of signals received from said directions, means for counting said beat notes to provide pulses, and means for converting said pulses into increments of motion along said axis and in a scale proportional to the movement of said transmitting and receiving means along said axis.

References Cited in the file of this patent

UNITED STATES PATENTS

| | | |
|---|---|---|
| 2,744,683 | Gray | May 8, 1956 |
| 2,908,888 | Kirkland | Oct. 13, 1959 |